Patented July 27, 1954

2,684,969

UNITED STATES PATENT OFFICE 2,684,969

PROCESS FOR THE PREPARATION OF HYDROXY AMIDES FROM HYDROXY AMINES AND CARBOXYLIC ACID HALIDES

Irving Joseph Krems, Bronx, and Henry Arnold Goldsmith, Long Island City, N. Y., assignors to Colgate-Palmolive Company, Jersey City, N. J., a corporation of Delaware No Drawing. Application December 28, 1950, Serial No. 203,208

5 Claims. (Cl. 260—404)

The present invention relates to a process for preparing hydroxy amides and has particular reference to a process for the preparation of hydroxy amides in a substantially pure form suitable for incorporation in detergent compositions. The term "hydroxy amide," as used both in the specification and in the appended claims, refers only to those hydroxy amides which have an alkyl group joining an hydroxy group to an amino group.

Heretofore, hydroxy amides have been prepared by reacting high molecular weight fatty acids or the acyl halides thereof with hydroxy alkyl amines in the absence of an aqueous medium. The satisfactory operation of such a procedure has, however, necessitated the employment of relatively high reaction temperatures, e. g. 150° to 200° C., for relatively long periods of time, e. g. two to four hours. The products obtained from such a process have certain undesirable properties which lessen their suitability for use as detergents inasmuch as said products contain not only the desired hydroxy amide, but amine and amide esters in admixture therewith. When such products are incorporated in anionic synthetic detergents, the amine and amide esters present therein may adversely affect the surface active properties of the detergent, e. g., by the formation of undesirable anionic-cationic complexes, etc. within the body of the detergent composition.

It has now been discovered that hydroxy amides may be prepared in a form substantially free from esterified by-products of the type hereinbefore mentioned by condensing a carboxylic acid halide with an hydroxy amine, which has an alkyl group joining an hydroxy group to an amino group which has at least one replaceable hydrogen atom, in an aqueous solution containing a stable water immiscible solvent for hydroxy amides selected from the group consisting of hydrocarbons, halogenated hydrocarbons, ethers, and ketones in the presence of an acceptor for liberated hydrogen halide. The incorporation of such a solvent has been found to be advantageous inasmuch as such a material maintains the reaction mixture in a mobile-emulsified form which is easy to handle and which facilitates the control of pH and temperature.

Hydroxy amides prepared in such a manner have a lighter color as well as surface active properties superior to those of products which have been prepared in accordance with processes disclosed in the prior art. Furthermore, the process of the present invention affords substantial economical advantages over certain processes heretofore suggested inasmuch as substantially pure hydroxy amides may now be prepared without the need of employing additional purification procedures.

In accordance with the present invention approximately equimolar quantities of an hydroxy amine, which has an alkyl group joining an hydroxy group to an amino group which has at least one replaceable hydrogen atom, and a carboxylic acid halide are condensed, in the presence of an acceptor for liberated hydrogen halide, in an aqueous medium containing a water immiscible solvent for hydroxy amides selected from the group consisting of hydrocarbons, halogenated hydrocarbons, ethers, and ketones. While the accepting material for the liberated hydrogen halide may be introduced at any time during the condensation reaction, said material is preferably added after about one-half of said carboxylic acid halide has been added to the mixture. Accordingly, in the preferred practice of the present invention approximately one-half of said carboxylic acid halide is introduced into the mixture whereupon said acid halide reacts with about one-half of said hydroxy amine present therein to form an hydroxy amide; the remainder of said hydroxy amine combines with the liberated hydrogen halide and forms an amine salt. If more than the preferred amount of said acid halide is added to the mixture the excess will react with the amine salt and form an undesirable amine ester. An acceptor (e. g. KOH, NaOH, etc.) and the remaining portion of the carboxylic acid halide are then simultaneously introduced into the mixture. Said acceptor neutralizes both the newly liberated hydrogen halide and the hydrogen halide previously combined with said hydroxy amine whereupon said hydroxy amine is free to react with the carboxylic acid halide to form additional hydroxy amide. The subsequent removal of water and solvent from the heterogeneous mixture thus produced yields an hydroxy amide product suitable for incorporation in detergent compositions.

It will be understood that while the particular hydroxy amine selected will act as an acceptor for the hydrogen halide liberated during the condensation reaction, in the practice of the present invention the neutralizing action of such a material is preferably assisted by the incorporation of additional relatively inexpensive neutralizing agents. Suitable compounds include potassium hydroxide, sodium hydroxide, lithium hydroxide, potassium carbonate, sodium carbonate, lithium carbonate, sodium bicarbonate, potassium bicarbonate, lithium bicarbonate, magnesium hydroxide, etc. as well as organic tertiary amines, e. g. triethylamine, trimethylamine, etc.

Hydroxy amine compounds suitable for amidation in accordance with the present invention include those hydroxy amines having an alkyl group joining an hydroxy group to an amino group which has at least one replaceable hydrogen atom. It will be understood that the term "hydroxy amine," both in the specification and the appended claims, is used in the limited sense herein indicated. Among the representative hydroxy amines which may be used are, for example, monoethanolamine, diethanolamine, monopropanolamine, dipropanolamine, dibutanolamine, monobutanolamine, monoisobutanolamine, monopentanolamine, mono- and di-pentanolamine, mono- and di-hexanolamine, mono- and di-octanolamine, mono-laurylolamine, mono-hexa-decylolamine, mono-ethyl ethanolamine, mono-octadecylolamine, mono-butyl ethanolamine, cyclohexyl ethanolamine, ethanol-aniline, 2 - methylamino - propanediol - 1,3; 1-phenyl - amino - propane - diol - 2,3; 1 - hydroxy-ethylamino-2,-methoxy-propan-ol-3; diglycerol monoamine, diglycerol diamine; etc.

The carboxylic acid halides referred to are well known in the art and may be selected from a large group. Such compounds may be derived from cylic and acylic, saturated and unsaturated, carboxylic acids such as butyric, caproic, enanthic, pimelic, caprylic, pelargonic, sebacic, arachidic, cerotic, behenic, melissic, erucic, oleic, ricinoleic, stearic, linoleic, linolenic, lauric, myristic, palmitic, benzoic, cyclohexylacetic, naphthoic acids, etc. Such acids may be used alone, in any desired mixture thereof, or in admixture with higher fatty acids derived from coconut, palm kernel, palm, olive, cottonseed, corn, peanut oils, etc.

In order to indicate even more fully the nature of the present invention the following examples are set forth. It will be understood that these examples are presented for illustrative purposes only and that they are not intended to limit the scope of the invention in any manner. It will be realized by those skilled in the art that the invention is not restricted to the examples except as indicated in the appended claims.

*Example I*

Part A.—About 202 grams (1 mol) of melted lauric acid (90%) was mixed with about 35 ml. (0.4 mol) of phosphorus trichloride at a temperature of approximately 40° C. After the resultant mixture had separated into two immiscible liquid layers, the lower layer consisting essentially of phosphorous acid was separated from the lauroyl chloride present in the upper layer.

Part B.—A mixture containing approximately 115.5 grams (1.1 mol) of diethanolamine dissolved in about 200 ml. of water and about 100 ml. of ethylene dichloride was placed in a reaction vessel and cooled to a temperature of about 10° to 20° C. Lauroyl chloride, prepared in the manner described in Part A, was slowly added, with stirring, until the pH of the resulting solution had dropped to about 8.5, e. g., after about 110 grams of lauroyl chloride had been added. Thereafter, about 61 grams (0.95 mol) of potassium hydroxide (87.5%) dissolved in about 200 ml. of water and about 110 grams of lauroyl chloride were introduced, the temperature being maintained between 10° to 20° C. and the pH around 8.5 to 9. The total amount of lauroyl chloride introduced into the mixture was 220 grams (1 mol). Upon heating to a temperature of approximately 70° to 75° C. the mixture thus prepared separated into two immiscible liquid layers.

Part C.—The upper organic layer was removed and diluted with about 100 ml. of chlorinated solvent and azeotropically distilled until substantially all water had been removed. The cooled anhydrous solution was then filtered to remove precipitated salts and soaps after which the clear filtrate was distilled, the last traces of solvent being removed under reduced pressures, e. g., about 10 mm. mercury and at a temperature not exceeding 100° C. The pale liquid residue crystallized to a low-melting waxy material containing about 96% lauric diethanolamide, about 3% lauric acid, and about 1% diethanolamine ester.

*Example II*

A reaction mixture, prepared in the manner described in Parts A and B of Example I, was heated to a temperature of approximately 70° to 75° C. to cause a liquid phase separation. Upon withdrawal of the aqueous lower layer the hydrogen ion concentration of the remaining organic layer was adjusted to around 5 by the addition of dilute hydrochloric acid. After the resultant mixture had separated into two immiscible liquid layers, the lower aqueous layer was withdrawn leaving the upper layer, containing principally lauric diethanolamide and ethylene dichloride. Said organic layer was diluted with about 100 ml. of ethylene dichloride and azeotropically distilled in accordance with Part C of Example I to yield a product suitable for use as a detergent composition. Said product contained about 97% lauric diethanolamide, about 2.5% lauric acid, and about 0.5% diethanolamine ester.

*Example III*

Approximately 208 grams (1 mol) of coconut oil fatty acid was introduced into a reaction vessel together with about 35 ml. (0.4 mol) of phosphorus trichloride at a temperature of about 40° C. Upon standing the mixture separated into two immiscible liquid layers. After the lower layer, comprising principally phosphorous acid, had been drawn off the upper layer containing the coconut fatty acid chloride was condensed with diethanolamine in the presence of an aqueous solution of ethylene dichloride and treated in the manner described in Parts B and C of Example I. The product so produced was suitable for incorporation in a synthetic detergent composition and contained about 95% coconut diethanolamide, about 3.5% coconut oil fatty acid, and about 1.5% diethanolamine ester.

It will be observed from the foregoing examples that ethylene dichloride has been used as the water immiscible solvent for the hydroxy amide condensation products and, in general, it is preferred due to the ease with which it may be handled. However, this material may be substituted either in whole or in part by other materials which satisfy the requirements of being stable, immiscible with water, as well as a solvent for hydroxy amides. Such materials are, for example, hydrocarbons, e. g., benzene, toluene, octane, iso-octane, heptane, etc.; halogenated hydrocarbons, e. g., carbon tetrachloride, chloroform, etc.; ethers, e. g., ethyl ether, isopropyl ether, n-butyl ether, amyl ether, etc.; and ketones, e. g., dipropyl ketone, diisopropyl ketone, dibutyl ketone, diisobutyl ketone, etc.

The presence of relatively large amounts, e. g., 5% or more, of hydroxy amine esters and free fatty acids derived from unreacted acid halide in the finished product has been found to result in the formation of undesirable materials when such finished products are incorporated in certain synthetic detergent compositions. In order to reduce the relative amounts of such esters and acids, the condensation reaction between the hydroxy amine and the carboxylic acid halide is preferably carried out at a pH on the order of 8.5 to 9. If the hydrogen ion concentration of the mixture is permitted to vary from this preferred range, the finished product will be contaminated with relatively large amounts of said esterified products and free fatty acids. The amounts of esterified hydroxy amine products present in the final product may be reduced still further by adjusting the pH of the mixture to around 3 to 5 prior to effecting the phase separation described. Such a reduction in the hydrogen ion concentration brings about the removal of the amino esters by causing the same to pass into the aqueous layer during the phase separation. If desired, the fatty acid material may be removed with an alkali wash or in accordance with any other suitable procedure well known in the art.

The temperature at which the condensation reaction is carried out is not critical. For example, equally satisfactory products are obtained when the reaction is carried out at 25° to 28° C. and at 44° to 47° C. While the condensation may suitably be effected at temperatures within a relatively wide range, the reaction is preferably carried out at temperatures between 15° and 30° C.

The finished products prepared in accordance with the present invention exhibit water solubility and have surface modifying properties. Such products may be used as cleaning agents particularly in hard water and where a fatty and/or oily film resists the ordinary cleansing media; in tooth pastes, tooth powders, and dentifrices generally; in softening and treating baths for hides and skins; in the treatment of paper pulp and cellulosic materials generally; etc. Similarly, these products may be employed in washing and laundering and in the textile, cosmetic, plastic, and leather industries generally wherein they function as wetting, lathering, detergent, emulsifying, penetrating, softening, finishing and dispersing agents.

Having thus described the invention, what is claimed is:

1. A process for the preparation of hydroxy amides which comprises establishing a mixture containing a stable water immiscible solvent for hydroxy amides and an aqueous solution of an hydroxy amine having an alkyl group joining an hydroxy group to an amino group which has at least one replaceable hydrogen atom, slowly adding a carboxylic acid halide when the mixture is at a temperature below about 50° C. in a quantity sufficient to reduce the pH of the mixture to about 8.5 to 9, and thereafter adding a second approximately equal quantity of carboxylic acid halide together with an acceptor for liberated hydrogen halide while maintaining the pH of the mixture between about 8.5 and 9, and separating the hydroxy amide from the solvent and the water.

2. A process for the preparation of hydroxy amides which comprises establishing a mixture containing a stable water immiscible solvent for hydroxy amides selected from the group consisting of hydrocarbons, halogenated hydrocarbons, ethers, and ketones and an aqueous solution of an hydroxy amine having an alkyl group joining an hydroxy group to an amino group which has at least one replaceable hydrogen atom, slowly adding a carboxylic acid halide when the mixture is at a temperature below about 50° C. in a quantity sufficient to reduce the pH of the mixture to about 8.5 to 9, and thereafter adding a second approximately equal quantity of carboxylic acid halide together with an acceptor for liberated hydrogen halide while maintaining the pH of the mixture between about 8.5 and 9, and separating the hydroxy amide from the solvent and the water.

3. A process for the preparation of hydroxy amides which comprises establishing a mixture containing a stable water immiscible solvent for hydroxy amides and an aqueous solution of an hydroxy amine having an alkyl group joining an hydroxy group to an amino group which has at least one replaceable hydrogen atom, slowly adding lauroyl chloride when the mixture is at a temperature below about 50° C. in a quantity sufficient to reduce the pH of the mixture to about 8.5 to 9, and thereafter adding a second approximately equal quantity of lauroyl chloride together with an acceptor for liberated hydrogen halide while maintaining the pH of the mixture between about 8.5 and 9, and separating the hydroxy amide from the solvent and the water.

4. A process for the preparation of hydroxy amides which comprises establishing a mixture containing a stable water immiscible solvent for hydroxy amides and an aqueous solution of diethanolamine, slowly adding lauroyl chloride when the mixture is at a temperature of about 10° to 20° C. in a quantity sufficient to reduce the pH of the mixture to about 8.5 to 9, and thereafter adding a second approximately equal quantity of lauroyl chloride together with an acceptor for liberated hydrogen halide while maintaining the pH of the mixture between about 8.5 and 9, and separating the hydroxy amide from the solvent and the water.

5. A process for the preparation of hydroxy amides which comprises establishing a mixture containing a stable water immiscible solvent for hydroxy amides and an aqueous solution of diethanolamine, slowly adding lauroyl chloride when the mixture is at a temperature of about 10° to 20° C. in a quantity sufficient to reduce the pH of the mixture to about 8.5 to 9, and thereafter adding a second approximately equal quantity of lauroyl chloride together with an acceptor for liberated hydrogen halide while maintaining the pH of the mixture between about 8.5 and 9, said lauroyl chloride and said diethanolamine being introduced in equal molar quantities, and separating the hydroxy amide from the solvent and the water.

References Cited in the file of this patent

UNITED STATES PATENTS

| Number | Name | Date |
| --- | --- | --- |
| 2,367,010 | Davis et al. | Jan. 9, 1945 |
| 2,402,541 | Farlow et al. | June 25, 1946 |
| 2,411,434 | Katzman | Nov. 19, 1946 |